(12) United States Patent
Gidney et al.

(10) Patent No.: US 8,372,187 B2
(45) Date of Patent: Feb. 12, 2013

(54) PARTICULATE MATTER GENERATOR AND COLLECTOR

(75) Inventors: Jeremy Temple Gidney, Cambridge (GB); Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 1030 days.

(21) Appl. No.: 11/789,240

(22) Filed: Apr. 24, 2007

(65) Prior Publication Data

US 2007/0248508 A1 Oct. 25, 2007

(30) Foreign Application Priority Data

Apr. 24, 2006 (GB) .................................. 0607851.3

(51) Int. Cl.
*B01D 49/00* (2006.01)
(52) U.S. Cl. ................ 96/422; 95/23; 96/417; 73/28.01
(58) Field of Classification Search .................. 73/28.01; 96/417, 422; 95/23
See application file for complete search history.

(56) References Cited

U.S. PATENT DOCUMENTS

| | | | | |
|---|---|---|---|---|
| 4,487,213 | A | * | 12/1984 | Gates et al. ....................... 137/2 |
| 6,705,341 | B2 | * | 3/2004 | Gill .............................. 137/486 |
| 6,946,101 | B1 | | 9/2005 | Jing |
| 2006/0068350 | A1 | | 3/2006 | Aigner et al. |
| 2008/0053195 | A1 | * | 3/2008 | Matter et al. ................. 73/28.01 |

FOREIGN PATENT DOCUMENTS

| | | |
|---|---|---|
| DE | 25 12 716 A1 | 10/1975 |
| DE | 37 10 749 C1 | 7/1988 |
| DE | 40 09 221 A1 | 9/1991 |
| DE | 42 01 060 A1 | 7/1993 |
| DE | 10 2005 010 766 A1 | 9/2006 |
| EP | 0 205 902 A1 | 12/1986 |
| EP | 0 341 832 B1 | 1/1996 |

(Continued)

OTHER PUBLICATIONS

Delavan, "Delavan Precision Oil Burner Nozzles" <http://www.delavaninc.com/pdf/protek_sheet.pdf>, Oct. 2003, pp. 1-3.*
Liampeng Jing, "Generation Combustion Soot Particles for Calibration Purposes," 2$^{nd}$ ETH Workshop, "Nanoparticle Measurement," ETH Hönggerberg Zürich, Aug. 7, 1998.

*Primary Examiner* — Jason M Greene
*Assistant Examiner* — Anthony Shumate
(74) *Attorney, Agent, or Firm* — Kevin M. Carroll; RatnerPrestia

(57) ABSTRACT

An apparatus for generating and collecting particulate matter derived from combusting a carbon-containing fuel in oxidizing gas includes a fuel burner housed in a container. The container has a gas inlet, a gas outlet; the gas outlet connects with a conduit for transporting the gas to atmosphere which is associated with means for forcing gas to flow from the gas inlet via the container and the conduit to atmosphere. Located within the conduit is a station for collecting particulate matter from gas flowing through the conduit. The gas flow-forcing means is controlled in response to a detected gas flow rate at the gas inlet to ensure the rate of gas flow at the gas inlet is maintained at a desired rate, thereby to promote particulate matter formation. A method for collecting particulate matter derived from combusting carbon-containing fuel employs the apparatus.

16 Claims, 4 Drawing Sheets

FOREIGN PATENT DOCUMENTS

| | | | |
|---|---|---|---|
| EP | 1 363 073 A1 | 11/2003 |
| EP | 1 616 914 A1 | 1/2006 |
| EP | 1 642 886 A1 | 4/2006 |
| EP | 1 712 521 A1 | 10/2006 |
| WO | WO-99/58614 A1 | 11/1999 |
| WO | WO-2005/058755 A1 | 6/2005 |

* cited by examiner

PARTICULATE MATTER GENERATOR AND COLLECTOR

FIELD OF THE INVENTION

The present invention relates to an apparatus for generating and collecting particulate matter derived from combusting a carbon-containing fuel.

BACKGROUND OF THE INVENTION

The automotive industry is required to limit certain emissions generated by engines when in use due to the adverse affect such emissions can have on human health and the environment. Such emissions include hydrocarbons, nitrogen oxides, sulphur oxides, carbon monoxide and particulate matter (PM).

One example of an exhaust treatment system component that helps enable the automotive industry to meet emission standards is the Johnson Matthey CRT® system. This technology (disclosed in EP 0 341 832) makes use of a process for combusting diesel particulate deposited on a filter in nitrogen dioxide at up to 400° C., which nitrogen dioxide is obtained by oxidising nitrogen monoxide in the exhaust gas over a suitable catalyst disposed upstream of the filter. The nitrogen monoxide oxidation catalyst can comprise a platinum group metal such as platinum, palladium, ruthenium, rhodium or combinations thereof. The filter can be coated with material that facilitates higher temperature combustion such as a base metal catalyst, e.g. vanadium oxide, $La/Cs/V_2O_5$ or a precious metal catalyst.

However, in an effort to continually reduce the adverse effect of engine emissions governments are adopting increasingly strict emission standards, e.g. according to European Union emission standards a diesel powered passenger car produced in 1993 was allowed to produce up to 0.140 g/km of PM (the so-called Euro I Tier Emission Standard), whereas in 2005 the regulated amount was no more than 0.025 g/km of PM (Euro IV Tier) and it is anticipated Euro V Tier could be 0.005 g/km. Therefore an exhaust treatment system that was able to meet the emission standards set for vehicles five years ago is not necessarily capable of meeting the emission standards set to be introduced in the near future. Hence new exhaust treatment systems constantly need to be developed to enable the automotive industry to meet the progressively stricter emission standards. However, as with the development of any new system (or component of a system) such a system needs to be tested in the laboratory before it is put to use in practice. Many tests might be carried out on an exhaust treatment system comprising a catalyst and/or a filter before the system is put into practice, such tests including durability testing, catalyst ageing, filter retention tests, pressure drop loading tests, ageing cycles with regeneration tests, $NO_x$-trap regeneration, soot mass limit tests, poison testing (including sulphation ageing, and testing to see how the catalyst and/or filter reacts to exposure to a range of chemicals such as phosphates, halides, alkaline earth and rare earth compounds), ash loading studies, white smoke tests and the testing of a system when the engine is fuelled with a variety of alternative fuels. Those organisations carrying out such tests include: exhaust system manufacturers (including filter manufacturers, coating companies and canning companies), vehicle manufacturers, consultancies, research institutions and academic laboratories.

Prior art methods of laboratory testing a new exhaust system tend to rely on the use of a bench-mounted vehicular internal combustion engine for prolonged periods of time, which is exceedingly costly. Nonetheless, since it is important that the testing of such a system should mimic the conditions under which the system would be used in practice, and that the PM contacting the system mimic the PM produced by an engine, no reliable alternative was previously available.

DE 37 10 749 C1 discloses an apparatus for simulating deposits of foreign substances contained in gaseous media on functional parts in flow systems, such as the deposit of soot in the air intake systems of engines. EP 1 616 914 A1 discloses an apparatus for producing carbon black with defined properties and for testing filters by passing a gas stream containing carbon black through a filter.

SUMMARY OF THE INVENTION

We have now developed an apparatus that enables exhaust system components, such as catalysts and filters, to be laboratory tested for their ability to collect PM. This apparatus produces results that are strikingly similar, if not identical, to tests performed on an engine, but does not require the use of an engine as such.

According to a first aspect, the invention provides an apparatus for generating and collecting particulate matter derived from combusting a liquid carbon-containing fuel, which apparatus comprising a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet, the means preferably being a flow meter, and means for forcing an oxidising gas to flow from the gas inlet via the container, the gas outlet and the conduit to atmosphere, a station for collecting particulate matter from gas flowing through the conduit and means for controlling the gas flow-forcing means in response to a detected gas flow rate at the gas inlet, whereby the rate of gas flow at the gas inlet is maintained at a desired rate to provide substoichiometric fuel combustion within the container, thereby to promote particulate matter formation. Whether the whole of the fuel burner is enclosed within the container or just its nozzle will depend on the design preferences and design constraints of a particular user of the invention. Either embodiment may work equally well; what is key to the invention is that the fuel is burnt in a controlled environment to enable the reproducible generation of PM.

The gas flow-forcing means used in the present invention can draw and/or drive gas into the gas inlet of the container, and is preferably a pump or a fan. Optionally the gas flowing through the container and/or the oxidising gas is filtered to remove any particles present prior to being used in the apparatus. Additionally the temperature of the gases may be adjusted prior to being used in the apparatus, optionally using the air from an air-cooled radiator (see later).

BRIEF DESCRIPTION OF THE DRAWINGS

In order that the invention may be more fully understood, the following Examples are provided by way of illustration only and with reference to the accompanying drawings, in which.

DETAILED DESCRIPTION OF THE INVENTION

Figure 1:
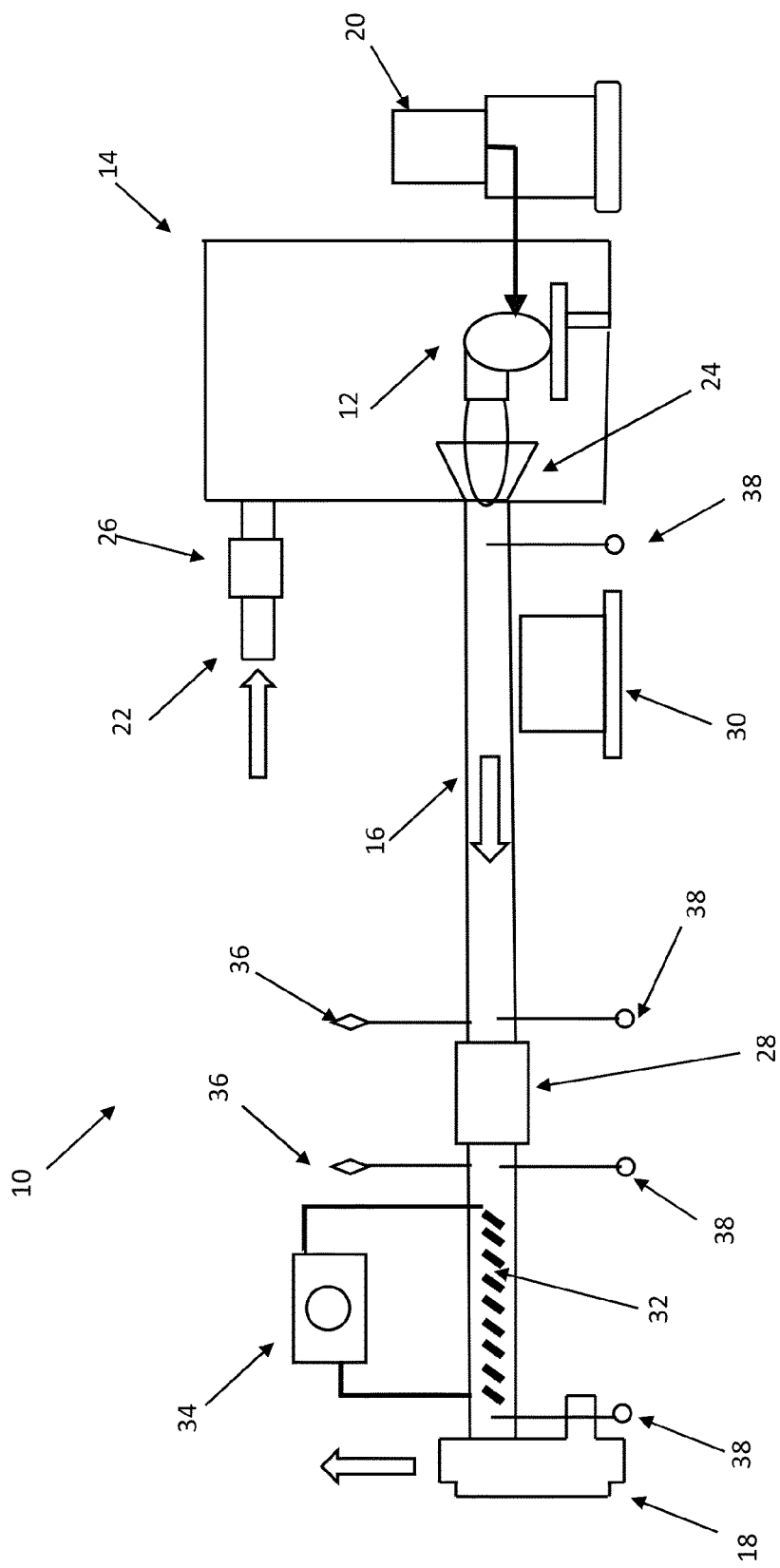
FIG. 1 is a schematic representation of one embodiment of an apparatus for generating and collecting PM according to the invention.

Controlling the gas flow rate is important for many reasons, including being able to achieve the reproducible generation of PM in separate tests. Generally decreasing the gas flow rate will cause the temperature of the gas exiting the container to increase, more specifically decreasing the gas flow rate through the container whilst increasing the flow rate of the gas supplied directly to the burner (see the third aspect of this invention below) stops the production of PM and increases the temperature of the exhaust gas exiting the container such that it is high enough to combust PM located within the station for collecting PM. Such high temperatures may prove useful in certain applications, e.g. when a filter is present in the station for collecting PM an increase in temperature may be used for the periodic regeneration of the filter. An alternative means of generating an exotherm to enable the combustion of PM located within the station for collecting PM is to inject additional fuel into the conduit upstream of the station for collecting PM.

In one embodiment, the oxidising gas is air, but it can be any synthetic gas or gas mixture, so long as the fuel will combust in it. The oxidising gas may be heated prior to it being used to combust the fuel. In embodiments of the invention using air as the oxidising gas, the air used in an air-cooled radiator (see later) may be used as the oxidising gas.

Using such an apparatus we have been able to reproduce engine-like temperature and air mass flow conditions and thereby produce PM of similar particle size, morphology and Volatile Organic Fraction (VOF) hydrocarbon content to that produced by an engine. This makes the apparatus suitable for, amongst other applications, carrying out laboratory tests on exhaust treatment systems comprising a catalyst and/or a filter, such as the tests described above.

The inventors have found that maintaining the container at sub-ambient pressure aids in the production of PM.

When the gas flow-forcing means draws the gas into the gas inlet of the container, such means may comprise a fan. This fan may be located, for example, between the station for collecting PM and a conduit exit to atmosphere. Since the high temperature of the gas exiting the station for collecting PM may adversely affect the efficiency of the fan, or other gas-drawing means, a heat exchanger may be located in the conduit between the station for collecting PM and a conduit exit to atmosphere thereby to facilitate cooling of the gas. The heat exchanger may additionally comprise an air-cooled or water-cooled radiator. When an air-cooled radiator is used the air used in the air-cooled radiator may be used as the oxidising gas used to combust the fuel (see above) or may be mixed with the gas flowing through the conduit either upstream or downstream of the station for collecting PM.

The inventors have found that when a filter is present in the station for collecting PM, the use of gas flow-forcing means that draws the gas into the gas inlet of the container helps to prevent high pressures being created in front of the station for collecting PM and helps prevent particle coagulation thereby maintaining the size of the PM. Nonetheless gas flow-forcing means that drives the gas into the gas inlet of the container may be better suited to other applications.

When the gas flow-forcing means drives the gas into the gas inlet of the container, such means may comprise a pump.

In order that the gas flowing through the station for collecting PM resembles the gas flowing through an exhaust treatment system (i.e. the gas is within a particular temperature range and is well mixed) it is desirable to locate a certain length of conduit between the gas outlet and the station for collecting PM. This length may be from 5 to 50 times a diameter of the conduit, commonly from 10 to 30 times a diameter of the conduit. Additionally, locating a certain length of conduit between the gas outlet and the station for collecting PM is thought to enable the accumulation of particles to form larger species and the adsorption of hydrocarbon onto PM, once again ensuring that the gas flowing through the station for collecting PM resembles the gas flowing through an exhaust treatment system.

The inventors have found controlling the rate of fuel flowing into the fuel burner and controlling the temperature of that fuel (and thereby its viscosity as well) results in better reproducibility of PM produced according to this invention. Therefore in one embodiment, the apparatus additionally comprises means, when in use, for controlling a rate of fuel flowing into the fuel burner and means, when in use, for controlling the temperature of the fuel flowing into the fuel burner.

A fuel burner suitable for use in this invention may comprise a fuel pump, a nozzle, a means of ignition, e.g. a spark plug and a safety cut out (to prevent fuel being pumped but not ignited), e.g. a photocell or ion detector with suitable associated electronic circuitry. We have found that nozzles designed to produce a solid cone distribution pattern of fuel (e.g. the ProTek™ nozzle system made by Delavan) enable the production of PM thereby producing PM with similar characteristics to that produced by the combustion of atomised fuel droplets within an engine cylinder. We believe this is because such nozzles produce a dense distribution of fuel (relative to a hollow cone distribution). Therefore the inventors envisage that other techniques that enable fuel to be burnt under conditions that restrict oxygen access to the fuel are likely to achieve similar results. Furthermore, varying the cone angle, spray distribution and fuel pressure changes the mass flow rate of the fuel, which mimics an engine operating under different loads resulting in different size distributions in the PM being produced.

The nozzle of the fuel burner may be positioned horizontally or vertically, each of which has potential advantages. One advantage of the fuel burner being positioned vertically is that this helps overcome some of the buoyancy effects of the flame and can result in better mixing within the conduit as a result.

The fuel burner can be adapted to burn a variety of hydrocarbon and oxygenated fuels and may also be adapted to burn other compounds such as exhaust gas precursor compounds. Alternatively such compounds or exhaust gas components themselves (e.g. NO) may be injected into the gas exiting the container using an injector within the conduit.

To enable the testing of diesel exhaust systems, the station for collecting PM may be adapted to receive a catalyst monolith substrate or filter, e.g. a $NO_x$ catalyst, a diesel particulate filter (DPF) or a catalysed soot filter (CSF). Alternatively this invention may be applied to other systems, such as air filtration systems, or any other application in which the deposit of PM is of interest. Regardless of the application of the apparatus of this invention, an oxidation catalyst may be located within the conduit downstream of the station for collecting PM so that the pollutants present in the gas flowing through the conduit may be removed prior to exit to atmosphere.

In order to provide useful results, laboratory tests carried out on exhaust system components using the apparatus of the invention can record characteristics of each test to enable the collection and comparison of results and to ensure that the tests provide as much information as possible. Such characteristics include pressure and temperature measurements; consequently the apparatus according to the invention may comprise pressure and/or temperature sensing means. In the case of pressure measurements, it is particularly of interest to record the pressure drop associated with gas flowing through an exhaust system component located within the station for collecting PM. To enable such measurements to be collected a differential pressure sensor may be used with one tapping located on an upstream side of the station, another tapping located on a downstream side of the station for collecting PM. Temperature sensing means may also be located in the conduit either side of the station for collecting PM, and optionally at other locations along the length of the conduit to sense the temperature of the gas as it flows through the apparatus, e.g. at the outlet of the container. One suitable form of temperature sensing means is a thermocouple. The rate at which PM is produced may also be monitored.

In addition to it being useful to record the characteristics of each test, such characteristics may also be used to control the conditions of each test. Therefore in one embodiment of the invention the apparatus comprises means, when in use, for controlling the rate of gas flow at the gas inlet in response to information from the pressure drop determining means (in addition to controlling the gas flow-forcing means in response to a detected gas flow rate at the gas inlet). The control means is preferably an electronic control unit (ECU).

It should be appreciated that this apparatus could be used to test other technology for PM collection characteristics, for example the testing of air filters, optionally those in air induction systems.

According to a second aspect, the invention provides a method of generating and collecting particulate matter derived from combusting liquid carbon-containing fuel in an oxidising gas, which method comprising burning the fuel in a substoichiometric quantity of oxidising gas in a fuel burner, said fuel burner comprising a nozzle, which nozzle being housed in a container, forcing an oxidising gas to flow from a gas inlet to the container to atmosphere via a gas outlet to the container and a conduit connected to the gas outlet, collecting particulate matter at a station located within the conduit, detecting a rate of oxidising gas flow at the gas inlet and controlling the rate of oxidising gas flow so that a desired rate of oxidising gas flow is maintained at the gas inlet.

As discussed above, the inventors have found that controlling the gas supply to a container that houses a fuel burner, thereby to generate a sooty flame mimics the combustion of fuel within an engine cylinder. That is why the method of the present invention comprises generating PM by combusting the fuel in a substoichiometric quantity of oxidising gas, i.e. when an excess of fuel is present relative to the mass of oxidising gas present leading to incomplete fuel combustion.

The fuel burnt in the fuel burner can be a variety of hydrocarbon and oxygenated fuels, including standard automotive fuel, e.g. diesel fuel or gasoline, alcohols, biodiesel, LPG (liquefied petroleum gas), FT-GTL (Fischer-Tropsch gas to liquids) and dimethyl ether.

The fuel burner may also burn other compounds in addition to hydrocarbon fuels and oxygenated fuels. These additional compounds may be precursors of exhaust gas components such as $NO_x$ or $SO_x$, e.g. amines or organosulphur compounds. Alternatively such compounds (or exhaust gas components themselves) may be injected into the gas exiting the container using an injector within the conduit. Whether burnt or injected, the exhaust gas precursor compounds are intended to at least partially decompose before they reach the station for collecting particulate matter The inventors have found that the method for generating and collecting PM according to the invention can generate PM at a rate of from 1.0 to 20.0 g/hr, commonly from 1.0 to 5.0 g/hr, optionally from 1.0 to 3.5 g/hr. These rates of PM deposition encompass the rates for both light duty diesel (LDD) engines and heavy duty diesel (HDD) engines, therefore making this method suitable for laboratory testing new exhaust systems for both LDD and HDD applications.

Since changing the mass flow rate of the fuel mimics an engine operating under different loads, see above, laboratory testing of a catalyst monolith substrate or filter for use in an exhaust system might involve altering the mass flow rate over the course of a test so as to form a drive cycle type test.

Also as discussed above, the inventors have found it to be useful that the gas flowing through the station for collecting PM is similar to the gas produced by a vehicular engine flowing through an exhaust treatment system. Features of the gas flowing through the station for collecting PM that preferably should be comparable to the features of the gas flowing through an exhaust treatment system include the temperature, flow rate and PM deposition rate. In one embodiment, the temperature of the gas flowing into the station for collecting PM is from 100 to 300° C., optionally from 100 to 225° C. This temperature may be achieved by actively and/or passively cooling the gas flowing through the conduit such that the temperature of gas flowing into the station for collecting PM is at least 80° C. less than the temperature of gas flowing through the container gas outlet, e.g. 340° C. at the container gas outlet reducing to a temperature of from 250 to 220° C. at the inlet for the station for collecting PM. Alternatively the gas may be sufficiently cooled within the container that the temperature of gas flowing through the container gas outlet is approximately the same as the temperature of gas flowing into the station for collecting PM.

Techniques for actively cooling the gas flowing through the conduit may comprise using a fan or enclosing the conduit in a water jacket. Passively cooling the gas flowing through the conduit may comprise using a longer length of conduit (so that a large surface area is in contact with air at ambient temperature) or designing the conduit to have externally mounted cooling fins to act as a heat sink.

Optionally, or in addition, the gas exiting the station for collecting PM may be cooled to improve fan efficiency, e.g. by using a heat exchanger. The heat exchanger may additionally comprise an air-cooled or water-cooled radiator.

Another part of this invention relates to a two-stage combustion process and the apparatus developed to enable this process to take place.

Prior art methods of combusting a liquid carbon-containing fuel include that disclosed in EP 0 205 902 A1 which relates to an apparatus for carbon black production which controls the flow of air around a fuel nozzle using an air guidance body, which fuel/air mixture is homogenised in a first chamber then ignited in a second chamber. DE 25 12 716 A1 discloses an apparatus that controls the flow of air around a fuel nozzle using swirl vanes, then ignites the air/fuel mixture formed. The design of the apparatus disclosed in DE 25 12 716 A1 is such that all the air that contacts the fuel is turbulent since it must flow past the swirl vanes to reach the fuel and therefore combustion occurs using only turbulent air.

Thus according to a third aspect, the invention provides a method of combusting a liquid carbon-containing fuel to generate particulate matter for laboratory analysis, which method comprising the steps of generating a fine mist spray of droplets of fuel surrounded by a flowing stream of oxidising gas in a combustion can to generate a flowing rich combustion mixture, igniting the flowing rich combustion mixture in the combustion can and continuing to combust the flowing rich combustion mixture as it exits the combustion can, whereby the combustion mixture exiting the combustion can is made leaner as it becomes mixed with substantially non-turbulent entrained air. Herein the term "substantially non-turbulent" is used to refer to the fact that the air surrounding the combustion can is not deliberately made turbulent. In some embodiments the air surrounding the combustion can may flow around the combustion can (such as through the container described in the first and second aspects of this invention) to ensure a supply of entrained air is available for the method of combustion, however even in such embodiments the air around the combustion can will not be agitated by any physical means.

As with the method for generating and collecting PM described above, the fuel combusted may be hydrocarbon fuels and oxygenated fuels. Additionally this method may include the combustion of exhaust gas precursor compound in addition to the fuel.

According to a further aspect, the invention provides apparatus for use in the method described above, which apparatus comprising a nozzle for spraying a fine mist spray of droplets of carbon-containing fuel into a combustion can comprising an exhaust port, means for producing a stream of oxidising gas to surround the fuel spray and means for igniting the fuel spray as it exits the nozzle.

As with the apparatus for generating and collecting PM described above, the nozzle may be designed to produce a solid cone spray distribution pattern of fuel droplets and the nozzle of the fuel burner may be positioned horizontally or vertically.

Figure 2:
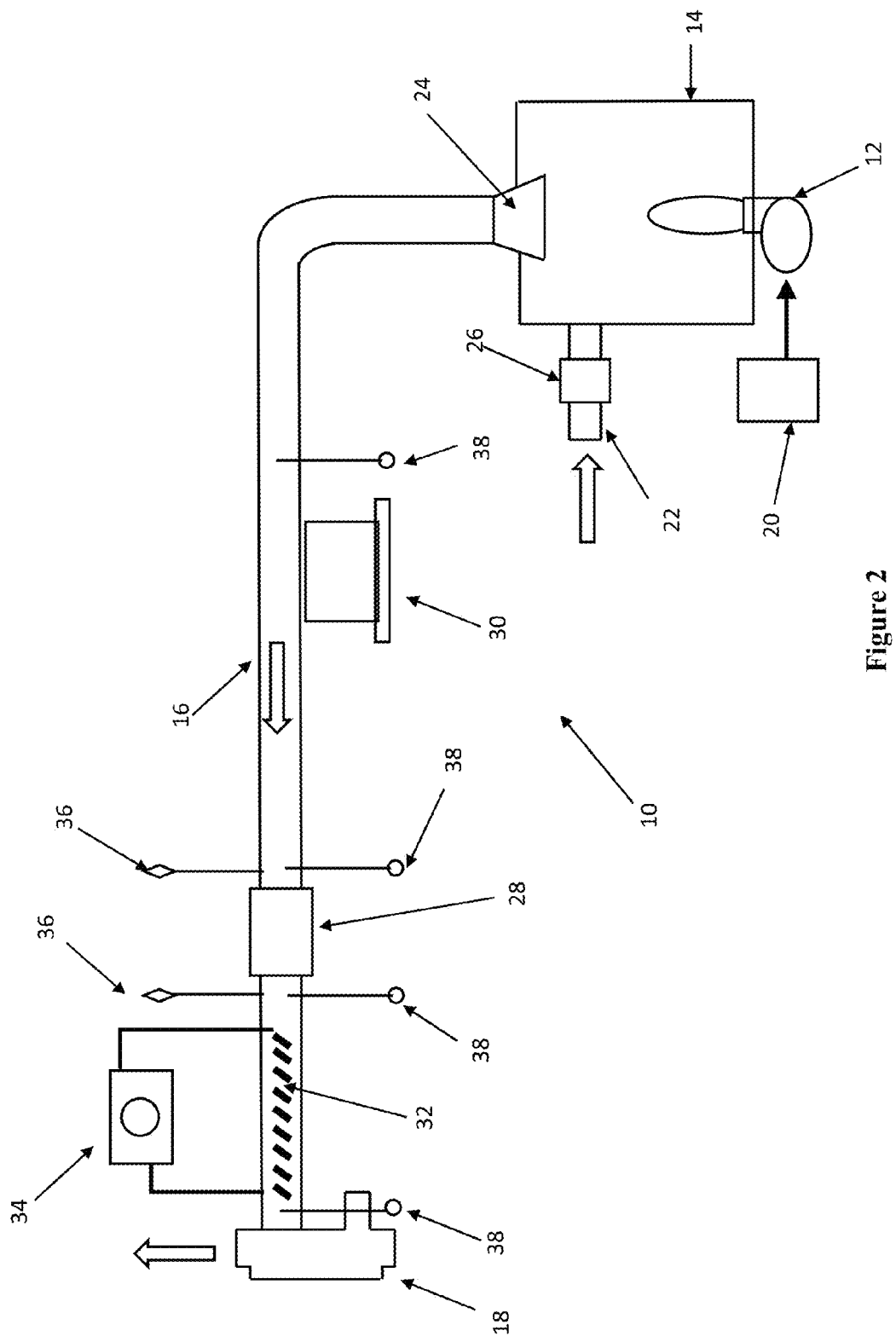
FIG. 2 is a schematic representation of an alternative embodiment of an apparatus for generating and collecting PM according to the invention.

With reference to FIGS. 1 and 2, an apparatus for collecting PM derived from combusting a carbon-containing fuel 10, comprises a fuel burner 12, the nozzle of which is housed in a container 14, a conduit for transporting the gas 16 and a fan 18 to draw the gas through the container and the conduit to atmosphere. The fuel burner is fed from a fuel reserve 20. The apparatus may additionally comprise means, when in use, for controlling the fuel flow rate (not shown) and means, when in use, for controlling the temperature of the fuel (not shown). The container has a gas inlet 22, a gas outlet 24 and a flow meter 26 to determine the rate of gas flowing through the gas inlet. A CSF 28 is positioned within the station for collecting PM, which in turn is located within the conduit. The gas flowing through the conduit upstream of the CSF is cooled by a fan 30, whilst the gas flowing through the conduit downstream of the CSF is cooled by a heat exchanger 32 associated with a water-cooled radiator 34. Pressure sensors 36 are located either side of the CSF. Temperature sensors 38 are located at various positions along the length of the conduit.

Figure 3:
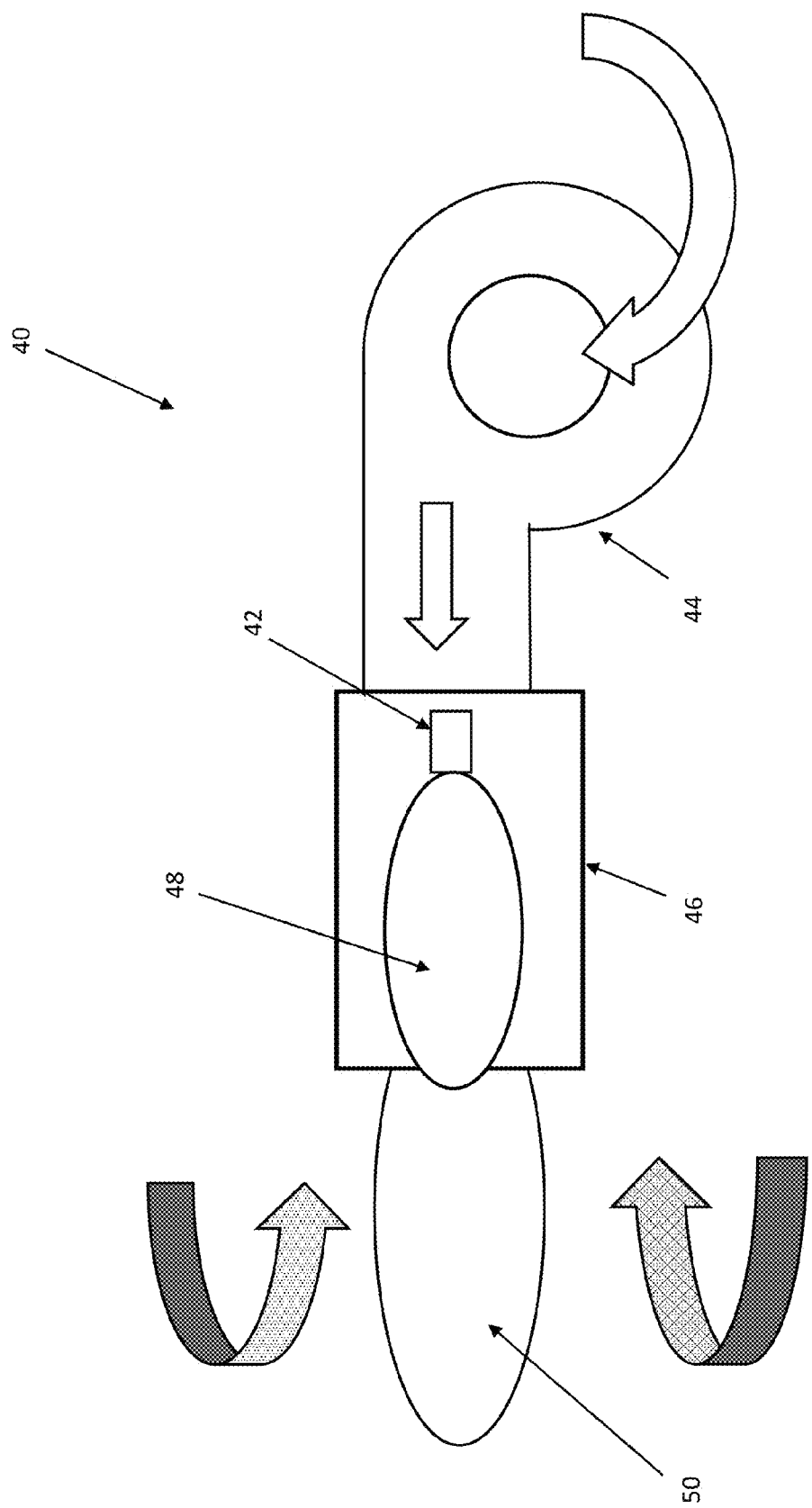
FIG. 3 is a schematic representation of one embodiment of an apparatus for igniting carbon-containing fuel in a two-stage combustion process according to the invention.

With reference to FIG. 3, an apparatus 40 for igniting carbon-containing fuel in a two-stage combustion process, comprises a nozzle 42 for spraying a jet of fuel droplets and a fan 44 for producing a stream of oxidising gas to surround the fuel jet both contained within a combustion can 46. When ignited the fuel jet is partially combusted in a rich primary flame 48 before the fuel jet and stream of oxidising gas exit the combustion can 46 and become mixed with entrained gas such that the fuel is combusted further in a lean outer flame region 50. The white arrows represent the direction of gas flow for the gas supplied by the fan, whilst the pale grey arrows represent the direction of gas flow for the entrained gas.

Example 1

Particulate Matter Collection During Engine Testing

A bench-mounted engine was set up to run over a 10 hour cycle that simulates typical urban driving conditions. Approximately 27 kg of standard diesel fuel (50 ppm sulphur) was used over the course of the cycle. The exhaust gases from the engine flowed through a CSF positioned such that the inlet temperature was between 250 and 350° C. A differential pressure sensor, with one tapping located on the upstream side of the CSF and the other tapping located on the downstream side of the CSF, was used to measure the pressure drop (or back pressure) across the CSF.

Once the experiment was complete, the apparatus was allowed to cool and the CSF brick removed, heated to 150° C. for 2 hours to remove any adsorbed water, and weighed. The CSF was then heated to 650° C. (at a ramp rate of 12° C./min) and held at that temperature for 3 hours to burn off any PM that had collected on it. Once the CSF had cooled to 150° C. it was re-weighed and the weight difference noted down as the PM content of the CSF post-treatment in the apparatus.

Example 2

Particulate Matter Collection During Use of Apparatus

An apparatus resembling that depicted in FIG. 1 was set up with standard diesel fuel (50 ppm sulphur) in the fuel reserve. The air flow rate at the inlet to the container was set at 2.4 m³/minute, as controlled by the power supplied to the fan positioned at the end of the conduit through which gas exits to atmosphere. The length of the conduit between the outlet from the fuel burner container and the CSF, and the use of a fan positioned under the conduit, ensured that the inlet temperature of the CSF was typical for an autocatalyst (220-250° C.). The CSF was decanned so that only the filter brick remained; this was then loaded into the conduit within the station for collecting PM (this is a similar procedure to the method of loading a CSF for engine testing, see Example 1). The fuel burner was ignited and allowed to burn for 5 hours, during which time 7 litres of fuel was consumed. A differential pressure sensor, with one tapping located on the upstream side of the station for collecting PM and the other tapping located on the downstream side of the station for collecting PM, was used to measure the pressure drop (or back pressure) across the station for collecting PM.

Once the experiment was complete, the PM content of the CSF post-treatment in the apparatus was determined as in Example 1.

Figure 4:
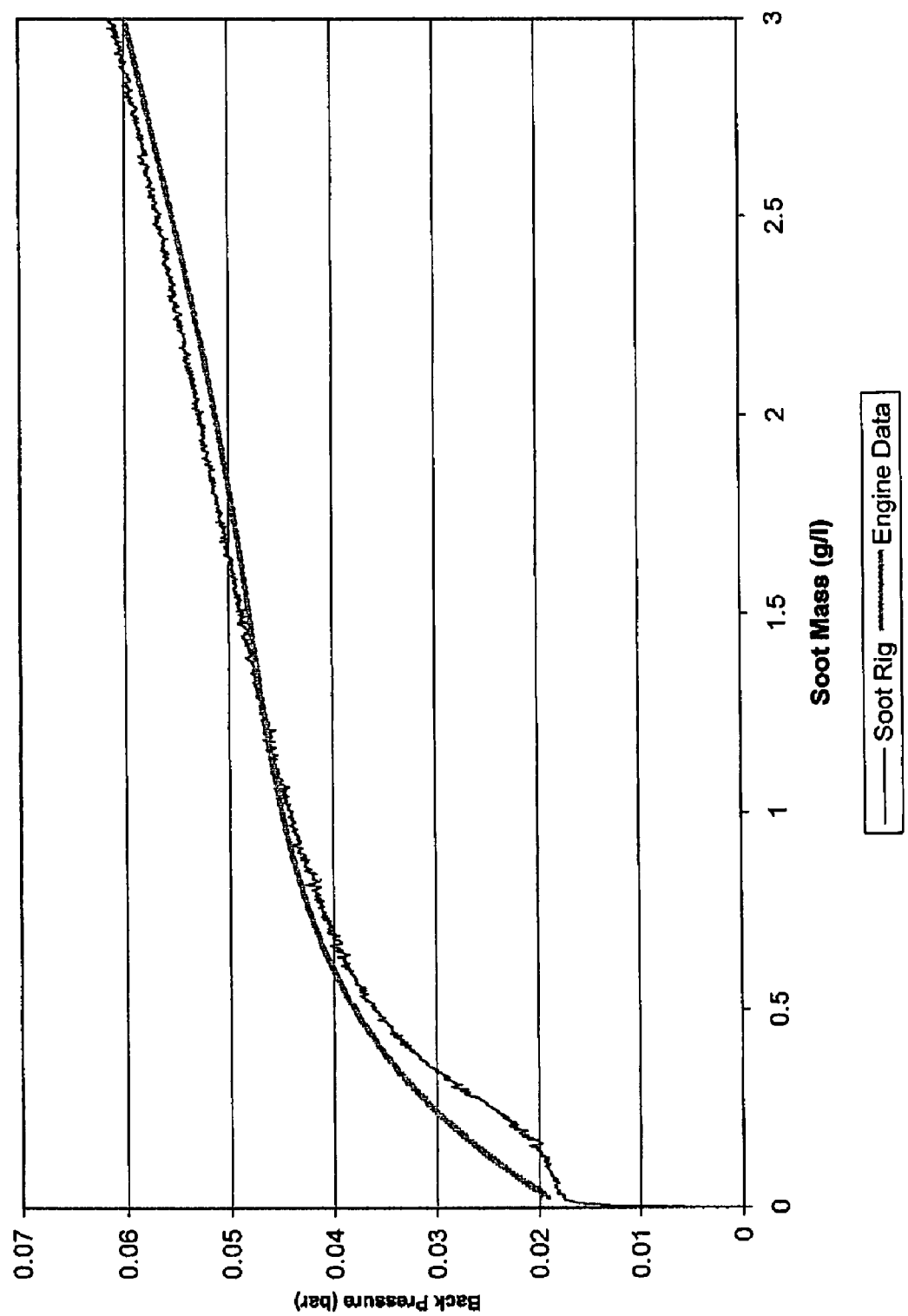
FIG. 4 is a graph showing the pressure drop across catalysed soot filters tested in a laboratory engine test and in an apparatus for generating and collecting PM, according to this invention.

FIG. 4 shows pressure drop as a function of particulate matter deposition (particulate matter deposition is calculated by dividing the total mass of particulate matter deposited by the time over which the experiment was run, thereby assuming a uniform deposition rate). The graph clearly shows that the pressure drop characteristics for the particulate matter generator of the present invention are very comparable to the pressure drop characteristics for an engine.

What is claimed:
1. An apparatus for generating and collecting particulate matter derived from combusting a liquid carbon-containing fuel, which apparatus comprising
 a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet and a gas flow-forcing means for forcing an oxidising gas to flow from the gas inlet via the container, the gas outlet and the conduit to atmosphere, a station for collecting particulate matter from gas flowing through the conduit and a control means for controlling the gas flow-forcing means in response to a detected gas flow rate at the gas inlet to maintain the rate of gas flow at the gas inlet at a desired rate to provide substoichiometric fuel combustion within the container, thereby to promote particulate matter formation.

2. An apparatus according to claim 1, wherein the gas flow-forcing means comprises a fan, optionally located between the station for collecting particulate matter and a conduit exit to atmosphere.

3. An apparatus according to claim 2, wherein the conduit between the station for collecting particulate matter and the conduit exit to atmosphere comprises a heat exchanger for reducing the temperature of exhaust gas contacting the fan.

4. An apparatus according to claim 1, wherein the gas flow-forcing means comprises a pump.

5. An apparatus according to claim 1, wherein a length of the conduit located between the container gas outlet and the station for collecting particulate matter is from 5 to 50 times a diameter of the conduit.

6. An apparatus according to claim 1 further comprising means, when in use, for controlling a rate of fuel flowing into the fuel burner and means, when in use, for controlling the temperature of the fuel flowing into the fuel burner.

7. An apparatus according to claim 1, wherein the nozzle is designed to produce a solid cone spray distribution pattern of fuel droplets.

8. An apparatus according to claim 1, wherein the nozzle is positioned vertically.

9. An apparatus according to claim 1, wherein an injector is located within the conduit.

10. An apparatus according to claim 1, wherein the station for collecting particulate matter is adapted to receive a catalyst substrate monolith or a filter.

11. An apparatus according to claim 1 further comprising a differential pressure sensor for determining a pressure drop across the station for collecting particulate matter, the differential pressure sensor having one tapping located on an upstream side of the station and another tapping located on a downstream side of the station.

12. An apparatus according to claim 11 further comprising means, when in use, for controlling the gas flow-forcing means in response to information from the pressure drop determining means in addition to controlling the gas flow-forcing means in response to a detected gas flow rate at the gas inlet.

13. An apparatus according to claim 12, wherein the control means comprises an electronic control unit (ECU).

14. An apparatus according to claim 1, wherein the control means comprises an electronic control unit (ECU).

15. An apparatus according to claim 3, wherein the heat exchanger is an air-cooled or water-cooled radiator.

16. An apparatus according to claim 1 further comprising a thermocouple for sensing the temperature of the gas as it flows through the apparatus.

* * * * *